(12) United States Patent
Vedantam et al.

(10) Patent No.: US 8,918,910 B2
(45) Date of Patent: *Dec. 23, 2014

(54) METHOD AND SYSTEM FOR SOFTWARE LICENSING UNDER MACHINE VIRTUALIZATION

(71) Applicant: Flexera Software LLC, San Jose, CA (US)

(72) Inventors: Sai Kennedy Vedantam, Saratoga, CA (US); Mark Lance Woollard, Portland, ME (US)

(73) Assignee: Flexera Software LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,635

(22) Filed: Jan. 23, 2014

(65) Prior Publication Data
US 2014/0143888 A1    May 22, 2014

Related U.S. Application Data

(63) Continuation of application No. 12/823,904, filed on Jun. 25, 2010, now Pat. No. 8,646,098.

(60) Provisional application No. 61/220,444, filed on Jun. 25, 2009.

(51) Int. Cl.
*H04N 7/16* (2011.01)
*G06F 21/10* (2013.01)
*G06F 21/12* (2013.01)

(52) U.S. Cl.
CPC .............. *G06F 21/105* (2013.01); *G06F 21/10* (2013.01); *G06F 21/121* (2013.01); *G06F 2221/0704* (2013.01)

USPC .......................................................... 726/31

(58) Field of Classification Search
None
See application file for complete search history.

(56) References Cited

U.S. PATENT DOCUMENTS

| | | | |
|---|---|---|---|
| 6,961,806 B1 | 11/2005 | Agesen et al. | |
| 7,313,512 B1 | 12/2007 | Traut et al. | |
| 8,646,098 B2 | 2/2014 | Vedantam et al. | |
| 2008/0005032 A1* | 1/2008 | Znidarsic | 705/59 |
| 2009/0328225 A1* | 12/2009 | Chambers et al. | 726/26 |

OTHER PUBLICATIONS

U.S. Appl. No. 12/823,904; Office Action mailed Apr. 5, 2013.
U.S. Appl. No. 12/823,904; Final Office Action mailed Oct. 10, 2012.
U.S. Appl. No. 12/823,904; Office Action mailed May 22, 2012.

* cited by examiner

*Primary Examiner* — Brandon Hoffman
(74) *Attorney, Agent, or Firm* — Lewis Roca Rothgerber LLP

(57) ABSTRACT

A method and system implementing software licensing management under machine virtualization are disclosed. According to one embodiment, a system comprises a virtual platform running on a physical machine; a binding agent running on a host operating system of the virtual platform; a license enforcement module running on a virtual machine instance of the virtual platform. The license enforcement module is in communication with the binding agent. The binding agent enforces a mutex lock to ensure that only a specified number of license enforcement modules are running on the physical machine.

21 Claims, 4 Drawing Sheets

METHOD AND SYSTEM FOR SOFTWARE LICENSING UNDER MACHINE VIRTUALIZATION

CROSS-REFERENCE TO RELATED APPLICATIONS

The present application is a continuation and claims the priority benefit of U.S. patent application Ser. No. 12/823,904 filed Jun. 25, 2010, which claims the priority benefit of U.S. provisional application Ser. No. 61/220,444 filed Jun. 25, 2009, the disclosures of which are incorporated herein by reference.

BACKGROUND

1. Field of the Invention

The present system and method relate to software licensing management, and more particularly, to implementing software licensing management under machine virtualization.

2. Description of the Related Art

Machine virtualization refers to implementing a machine using software. The machine may be, for example, a general purpose computer. A software-implemented machine is generally known as a virtual machine (VM). The software layer providing the virtualization is known as a hypervisor. The hypervisor may run on "bare-metal" hardware (i.e., does not require a host operating system) or on top of an operating system. Generally, multiple virtual machines may run simultaneously on one physical machine. Through machine virtualization, the physical characteristics of the physical machine may be hidden from software programs running on a virtual machine. Instead, the software programs executing on a virtual machine may be provided with an abstract computing platform that includes virtual hardware components. As far as the executing software programs are concerned, virtual hardware components may be no different from physical hardware components. This creates challenges for a license enforcement module that depends on identifying each computer by the characteristics of its hardware components.

To manage the use of its client software by users in a customer's enterprise, an independent software vendor (ISV) may often deploy licenses in which the licensed software is bound to a specific machine hosted by the customer. The license enforcement module is bound to a specific machine through a machine's bindings, which are the machine characteristics that the enforcement module uses to verify if the software is authorized to operate on that machine. The license enforcement module ensures that the correct number of users run the client software simultaneously according to the terms of the license. For example, if the customer purchased 50 floating licenses from the ISV, the license enforcement module will only allow up to 50 instances of the client software to run at any given time. However, if multiple license enforcement modules were allowed to run on the customer's hosting machine, such as running the license enforcement modules simultaneously on separate virtual machines, the customer may be able to overuse his licensing rights by running more instances of the client software than the number of licenses that were purchased (e.g., 3 license enforcement modules, each allowing up to 50 instances, would allow a total of 150 instances).

In view of the foregoing, there exists a need for a method and system for implementing software licensing management under machine virtualization that prevents or reduces license overuse by customers running multiple license enforcement modules.

SUMMARY OF THE PRESENTLY CLAIMED INVENTION

A method and system implementing software licensing management under machine virtualization are disclosed. According to one embodiment, a system comprises a virtual platform running on a physical machine; a binding agent running on a host operating system of the virtual platform; a license enforcement module running on a virtual machine instance of the virtual platform. The license enforcement module is in communication with the binding agent. The binding agent enforces a mutex lock to ensure that only a specified number of license enforcement modules are running on the physical machine.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
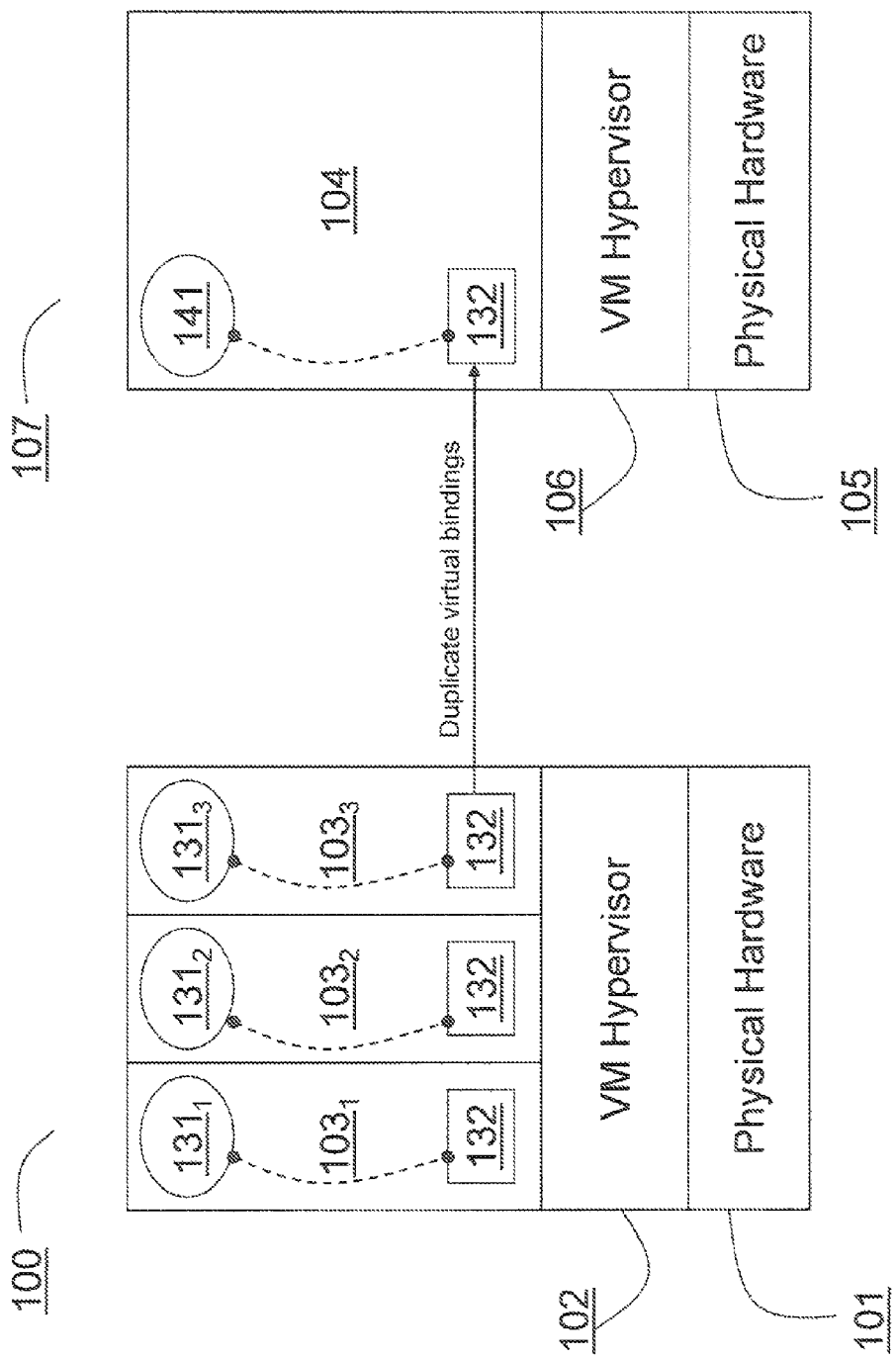
FIG. 1 illustrates a system architecture in the prior art in which multiple license enforcement modules bound to the same machine characteristics may be run on more than a single physical machine.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

There are at least two examples in which a customer may overuse the number of purchased licenses by running multiple license enforcement modules on separate virtual machines. FIG. 1 illustrates a system architecture in the prior art in which multiple license enforcement modules may be run on more than a single physical machine. As FIG. 1 illustrates, a physical machine 100 has a VM hypervisor 102 implemented on physical hardware 101. Physical machine 100 (and 107) may be a general purpose computer. Physical hardware 101 (and 105) may include the typical hardware components of a general purpose computer, such as a computer processor, a memory module, a hard disk, and a network card or module. The VM hypervisor 102 allows virtual machines 103.sub.1-3 to run simultaneously and separately from each other. Because the bindings of a virtual machine can be duplicated (e.g., IP address, disk volume serial, etc), each virtual machine 103.sub.i may have a duplicate set of virtual bindings 132, as shown in FIG. 1. By having a duplicate set of virtual bindings 132 in each virtual machine, separate instances of license enforcement modules 131.sub.i, each instance bounded (shown in dotted lines) to a respective duplicate set of virtual bindings 132, may be run within each virtual machine 103.sub.i. Moreover, because a virtual machine 104 having a duplicate set of virtual bindings 132 can be virtualized on a different physical machine 107, a license enforcement module 141 is not limited to being run on a single physical machine. In this manner, a license enforcement module may be copied between different physical machines because the license enforcement modules are bound to the virtual hardware bindings. A customer who runs multiple instances of a license enforcement module may intentionally or unintentionally overuse his licensing rights.

Architecture

Figure 2:
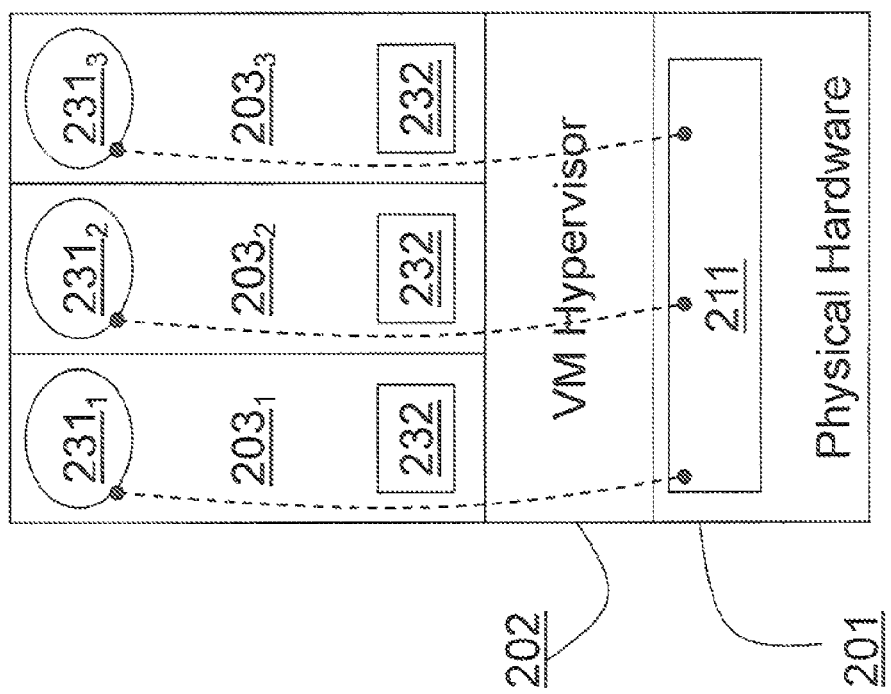
FIG. 2 illustrates an exemplary licensing system architecture in which multiple license enforcement modules are restricted to running on a single physical machine, according to one embodiment.

FIG. 2 illustrates an exemplary system architecture in which multiple license enforcement modules are restricted to running on one physical machine, according to one embodiment. As FIG. 2 illustrates, a VM hypervisor 202 is implemented on physical hardware 201. The VM hypervisor 202 allows virtual machines 203.sub.1-3 to run simultaneously and separately from each other. License enforcement modules 231.sub.1-3 are bound to the physical hardware bindings 211 of the underlying hardware instead of to the virtual bindings 232 of each virtual machine. As used throughout the disclosure, a license enforcement module may be a software license management server or a vendor daemon. An example of a physical hardware binding is the MAC (Ethernet) address of the machine. Having the license enforcement module 231.sub.i bind (shown in dotted lines) to the physical hardware bindings 211 prevents instances of the license enforcement module 231.sub.i from being run on a different physical machine. As FIG. 2 illustrates, even if each instance of a license enforcement module 231.sub.i is bound to the physical hardware bindings 211, multiple instances of the license enforcement module 231.sub.i are still able run on separate virtual machines.

Figure 3:
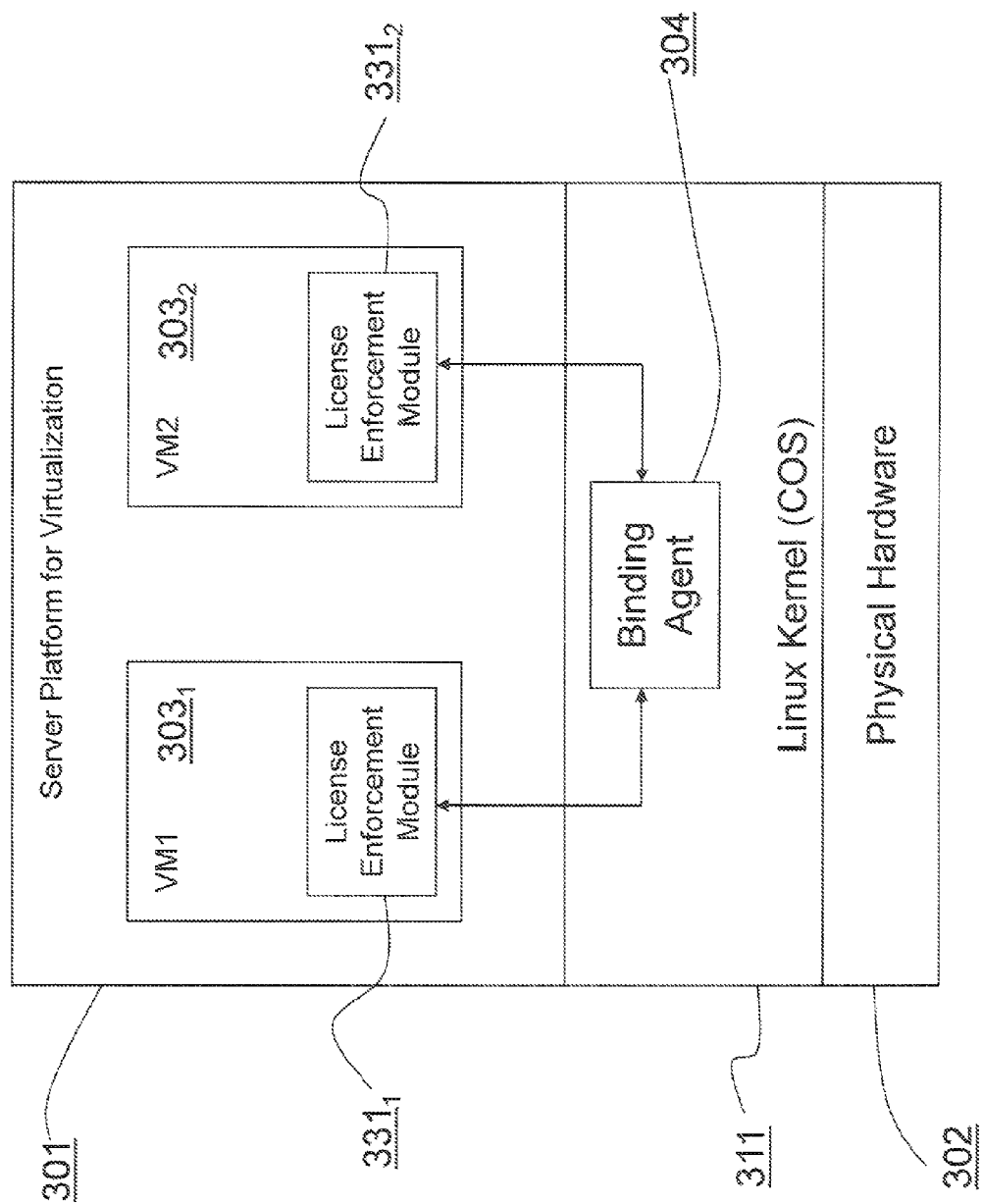
FIG. 3 illustrates an exemplary server architecture for ensuring that a single instance of a license enforcement module is being run on a single physical machine even under machine virtualization, according to one embodiment.

FIG. 3 illustrates an exemplary server architecture for ensuring that a single instance of a license enforcement module is being run on a physical machine even under machine virtualization, according to one embodiment. As shown, the system of FIG. 3 includes a virtual machine (VM) platform 301 for machine virtualization. For instance, VM platform 301 may be a VMWare ESX server product from VMWare that implements a bare-metal hypervisor (i.e., a hypervisor that does not require a host operating system). Other server platforms for machine virtualization are contemplated. The server platform 301 includes a console operating system (COS). A COS is a built-in operating system on which a bare-metal hypervisor is run. In the embodiment of FIG. 3, the linux kernel 311 serves as the COS running on physical hardware 302.

Also shown in FIG. 3 are two virtual machines 303.sub.1-2 that are running on the server platform 301. Each virtual machine 303.sub.i includes a license enforcement module 331.sub.i that communicates with a binding agent 304. The binding agent 304 may listen, for example, on a TCP communications channel for a license enforcement module to connect with. Once initiated, a license enforcement module 331.sub.1 may connect with the binding agent 304. The binding agent 304 may run on the linux kernel (COS) 311 of the server platform 301. Once connected, the binding agent 304 may:

- extract and provide the physical binding information (e.g., the Ethernet address) of the underlying physical hardware requested by the license enforcement module 331.sub.1;
- verify that no other server (of the same publisher) with the same binding information is currently connected to the binding agent 304; and
- maintain heart-beat contact with the license enforcement module 331.sub.1.

Having received the physical binding information from the binding agent 304, the license enforcement module 331.sub.1 may then validate the information against a license file that contains the binding information (i.e., hostid) of the machine to which the license enforcement module 331.sub.1 is bound to. Examples of valid hostids are discussed later. By verifying that no other server with the same binding information is currently connected, the binding agent 304 effectively enforces a mutex (mutual exclusion) lock to ensure that a single instance of the license enforcement module 331.sub.1 is allowed to run on the physical machine. A mutex lock, which may be implemented via hardware or software, is typically used to avoid concurrent accesses of a common resource. Thus, implementing a binding agent 304 in this manner significantly reduces, if not prevents, the possibility that customers are running two or more instances of a license enforcement module on the same physical machine.

It is recognized that other binding options may be necessary to accommodate server features such as fault tolerance (FT) and high availability (HA). FT is a feature that provides for continuous availability of service, without any data loss or downtime, to any application in the event of hardware failures. HA is a feature where processes running on one physical server machine may be migrated to another physical server machine and restarted quickly in case of a server hardware/software failure. The presently disclosed method and system allows an ISV to configure and offer multiple binding options to its varied customer base and allow it to control those options via the license file. Alternatively, the presently disclosed method and system also allows an ISV to log the usages of the license enforcement module as well as the client software. This way, an ISV and its customer may set up a compliance based solution with optional audits based on usage log reports.

Binding Information

A license file may contain the binding information of machine to which the license enforcement module is bound to. According to one embodiment, the binding information of the machine may be specified on the "SERVER" line of the license file using the following format:

SERVER host hostid [other options]

A valid hostid keyword may have the following format:

platform type_hostid type

"Platform type" may be a 3-letter representation of one of the platform types: VMW for VMWare ESX platform, PHY for a physical (non-virtual) platform, and VIR for a generic virtual platform. "Hostid type" represents the hostid type supported on the specific platform type. Valid keywords for hostid_type may include: ETHER for Ethernet/MAC address, INTERNET for the IP address, and HOSTNAME for the hostname. The following are examples of valid SERVER lines contained in license files:

SERVER my_server PHY_INTERNET=10.10.12.132

This SERVER line specifies the valid IP address of the underlying physical machine (i.e., binding information) to be "10.10.12.132". Only a physical machine having the IP address "10.10.12.132" is allowed to run an instance of a license enforcement module.

The license enforcement module understands the syntax of the hostid field. Once the license enforcement module is instantiated, it may read the SERVER line of a license file to verify that both the platform type and hostid type values (specified in the license file) match the actual values of the machine (virtual or physical) that the license enforcement module is running on. If the specified and actual values do not match, the license enforcement module may exit immediately with an error message. Depending on the binding option configured by the ISV, the actual values may be provided by a binding agent or extracted by the license enforcement module. The binding agent may be included as part of a license enforcement module toolkit, according to one embodiment.

Binding Options

The presently disclosed system and method allows the ISV to configure and offer multiple binding options to its varied customer base. The ISV first decides upon the virtualization policy that it would enforce with its license enforcement modules. That is, the ISV decides if it would exercise control over a customer that runs a license enforcement module on a virtual platform and if so, what bindings to grant. One trade-off is between protecting against license theft and allowing the ease of installation and license administration. For instance, if the ISV decides to protect against license theft by exerting greater control over a customer, the customer may need to perform additional steps to install a binding agent and the ISV may need to delegate more resources oversee the installation.

Usage Model

Under the options in which the ISV has chosen to enforce its virtual machine policies via hostids, valid license files containing the correct hostids may be generated by the ISV. To obtain the hostids of the intended machines (virtual or physical) for hosting the license enforcement modules, a license administrator may download a lmhostid utility that outputs a properly formatted hostid string when run on the intended machine. According to one embodiment, the lmhostid may be a platform specific utility. The lmhostid may be run, for instance, at the command-line of the intended host machine using the following:

lmhostid-hostidType

Figure 4:
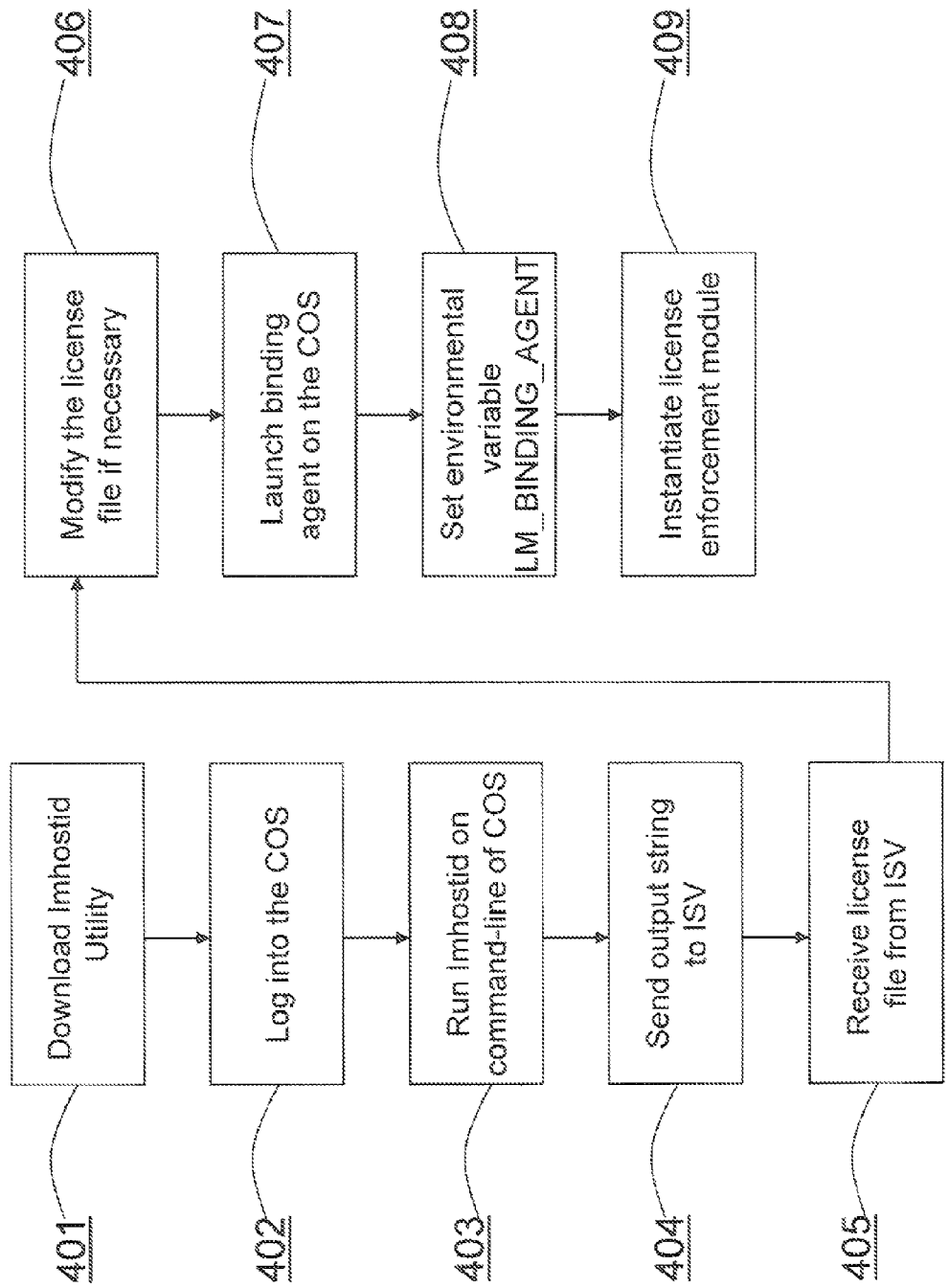
FIG. 4 illustrates an exemplary usage model for deploying a license enforcement module on a virtual machine platform that is hosting one or more virtual machines, according to one embodiment.

The string output of the lmhostid utility may be sent to the ISV, who then sends back to the license administrator a valid license file containing a SERVER line that specifies the hostid of the intended host machine. The license administrator may modify the license file to configure server parameters (e.g., TCP port-number). Finally, a license enforcement module may be instantiated on the intended host machine by associating the license enforcement module with the license file. If the license enforcement module is moved to another physical machine, the license administrator may make another request to the ISV and provide the output string of the lmhostid from the new intended host machine. The following describes an exemplary process for setting up a license enforcement module on a virtual machine:

The ISV may mandate using physical bindings via the VMW_ETHER option. As FIG. 4 illustrates, the license administrator makes a request to the ISV to host the license enforcement module on a virtual machine running on a virtual machine. To provide the ISV with the hostid of the virtual machine, the license administrator may download an lmhostid utility (401). After logging into the COS of the virtual machine (402), the license administrator may run the utility with the command 'lmhostid-ether-ptype VMW' at the command-line of the COS (403). The output string of the lmhostid utility may be sent to the ISV (404) that sends back a valid license file (405) that binds the license enforcement module to the Ethernet address of the COS. The license administrator may modify the license file to configure server parameters (e.g., TCP port-number) (406). The license administrator may then launch the binding agent on the COS, for instance, by using the command 'lmbind-port 27010-l lmbind:log' at the command-line of the COS (407).

On the virtual machine that is hosting the license enforcement module, the environment variable LM_BINDING_AGENT may be set to include the TCP port (port 27010 if using the command line above) and the host name or IP address of the COS. An example format may be the following (408):

port@host

In this format, port is the TCP port number where the binding agent is listening to and host is the hostname of the COS. The host name may be a fully qualified domain name depending on the network DNS settings. The following are examples to set up the LM_BINDING_AGENT variable:

export LM_BINDING_AGENT=27010@scengesx export LM_BINDING_AGENT=27011@scengesx.acresso.com Finally, having configured the license file and the environmental variable, a license enforcement module may be instantiated on the intended host virtual machine by associating the license enforcement module with the license file (409). If the license enforcement module is moved to another physical machine, the license administrator may make another license file request to the ISV. If the license enforcement module is only being moved to another virtual machine (on the same physical machine), the license administrator may simply start running the license enforcement module on a different instance of a virtual machine hosted on the same physical machine. The binding agent will enforce a mutex lock to ensure that, a single licensing system instance is running on the physical machine.

Utilities/Customizations

License Enforcement Module Customization

Once a license enforcement module is connected to the binding agent, the license enforcement module remains in heart-beat communication with the binding agent. The present system allows the ISV to configure the parameters of a license enforcement module, according to one embodiment.

lmhostid Utility

The lmhostid utility may be used with a command-line option '-ptype' that indicates the platform type, according to one embodiment. The '-ptype' may be indicated by any one of the following options:

PHY: Prefixes the generated hostid string with "PHY_"

VMW: Prefixes the generated hostid string with "VMW_"

VIR: Prefixes the generated hostid string with "VIR_"

The '-ptype' option may be used in conjunction with an existing hostid binding type. The following is an example command-line usage:

lmhostid-ptype VMW-ether

This example specifies the platform type to be a VMWare ESX server and the binding information to be the Ethernet address (i.e., hostid) of the underlying physical machine. The following is a corresponding sample output:

lmhostid-Copyright (c) 1989-2009 All Rights Reserved.

The host ID of this machine is "VMW_ETHER=0019d22f8672

VMW_ETHER=005056c00001

VMW_ETHER=005056c0000"

Although three hostids are outputted, the license administrator may only need to use one of the hostids.

Binding Agent

The binding agent may support the following command-line options, according to one embodiment:

-port <portNumber>: Specifies the TCP port number where the binding agent listens. If the specified port number is not available, the program may exit with an error. If this option is not specified, the first available, port in the range of 27010-27019 may be chosen.

Embodiments and methods as described herein have significant advantages over prior art implementations. As will be apparent to one of ordinary skill in the art, other similar arrangements are possible within the general scope. The embodiments and methods described above are intended to be exemplary rather than limiting, and the bounds should be determined from the claims.

What is claimed is:

1. A system for managing software licensing, the system comprising:
   a binding agent that extracts physical binding information of a physical machine on which the binding agent is running, and
   a license enforcement module instantiated on a virtual machine, wherein a license specifies that no more than a specified maximum number of license enforcement modules are allowed to run, the license enforcement module executed to communicate with the binding agent to determine whether the extracted physical binding information of the physical machine corresponds to the license and whether there is another machine with the same physical binding information associated with the binding agent, and
   wherein the binding agent ensures that no more than the specified maximum number of license enforcement modules are running as specified by the license.

2. The system of claim 1, wherein the license enforcement module maintains heart-beat communication with the binding agent.

3. The system of claim 2, wherein the heart-beat communication between the binding agent and the license enforcement module allows for configuration of parameters of the license enforcement module.

4. The system of claim 1, wherein the license enforcement module is reconfigured based on instructions from a software vendor providing software under the license.

5. The system of claim 1, wherein the physical binding information is selected from the group consisting of an Ethernet address, an IP address, and a disk volume serial number.

6. The system of claim 1, wherein the license enforcement module compares the extracted physical binding information to a platform type and a hostID type specified by the license.

7. The system of claim 1, wherein the specified maximum number of license enforcement modules is one, and wherein the binding agent ensures that no more than one license enforcement module is running by enforcing a mutex lock.

8. The system of claim 1, wherein the specified maximum number of license enforcement modules is two or more.

9. The system of claim 1, wherein the license is embodied in a license file.

10. The system of claim 1, wherein the binding agent is running on virtual platform.

11. A method for managing software licensing, the method comprising:
    executing a binding agent to extract physical binding information of a physical machine on which the binding agent is running;
    executing a license enforcement module instantiated on a virtual machine, wherein a license specifies that no more than a specified maximum number of license enforcement modules are allowed to run, the license enforcement module being executed to communicate with the binding agent to determine whether the extracted physical binding information of the physical machine corresponds to the license and whether there is another machine with the same physical binding information associated with the binding agent, and
    executing the binding agent to ensure that no more than the specified maximum number of license enforcement modules are running as specified by the license.

12. The method of claim 11, wherein the license enforcement module maintains heart-beat communication with the binding agent.

13. The method of claim 12, wherein the heart-beat communication between the binding agent and the license enforcement module allows for configuration of parameters of the license enforcement module.

14. The method of claim 11, further comprising reconfiguring the license enforcement module based on instructions from a software vendor providing software under the license.

15. The method of claim 11, wherein the physical binding information is selected from the group consisting of an Ethernet address, an IP address, and a disk volume serial number.

16. The method of claim 11, wherein the license enforcement module compares the extracted physical binding information to a platform type and a hostID type specified by the license.

17. The method of claim 11, wherein the specified maximum number of license enforcement modules is one, and wherein the binding agent ensures that no more than one license enforcement module is running by enforcing a mutex lock.

18. The method of claim 11, wherein the specified maximum number of license enforcement modules is two or more.

19. The method of claim 11, wherein the license is embodied in a license file.

20. The method of claim 11, wherein the binding agent is running on virtual platform.

21. A non-transitory computer-readable storage medium, having embodied thereon a program executable by a processor to perform a method for managing software licensing, the method comprising:
    executing a binding agent to extract physical binding information of a physical machine on which the binding agent is running;
    executing a license enforcement module instantiated on a virtual machine, wherein a license specifies that no more than a specified number of license enforcement modules are allowed to run, the license enforcement module being executed to communicate with the binding agent to determine whether the extracted physical binding information of the physical machine corresponds to the license and whether there is another machine with the same physical binding information associated with the binding agent, and
    executing the binding agent to ensure that no more than the specified number of license enforcement modules are running as specified by the license.

* * * * *